United States Patent

Spruill

[15] 3,639,206
[45] Feb. 1, 1972

[54] TREATMENT OF WASTE WATER FROM ALKALINE PULPING PROCESSES

[72] Inventor: Edgar L. Spruill, Jonesboro, La.

[73] Assignee: Continental Can Company, Inc., New York, N.Y.

[22] Filed: July 29, 1969

[21] Appl. No.: 845,809

[52] U.S. Cl. ................................ 162/29, 162/190, 210/53
[51] Int. Cl. ....................................................... D21f 1/66
[58] Field of Search ................. 162/33, 190; 210/42, 51, 52, 210/53

[56] References Cited

UNITED STATES PATENTS 1,263,532  4/1918  Cummings ............................ 210/42
3,531,370  9/1970  Gould ................................... 162/33

Primary Examiner—S. Leon Bashore
Assistant Examiner—Thomas G. Scavone
Attorney—Paul Shapiro, Joseph E. Kerwin and William A. Dittmann

[57] ABSTRACT

Waste water effluent derived from the alkaline pulping processes and discharged from pulp and paper mills containing suspended wood fibrous solids and discolored with dissolved wood degradation products is treated first with calcium salts, such as CaO or $Ca(OH)_2$ to cause a substantial reduction in the fiber solid and color content of the effluent. The partially clarified effluent is then contacted with $CO_2$ gas to precipitate any dissolved calcium salts and the remainder of the wood degradation products and color bodies.

6 Claims, 1 Drawing Figure

PATENTED FEB 1 1972
3,639,206
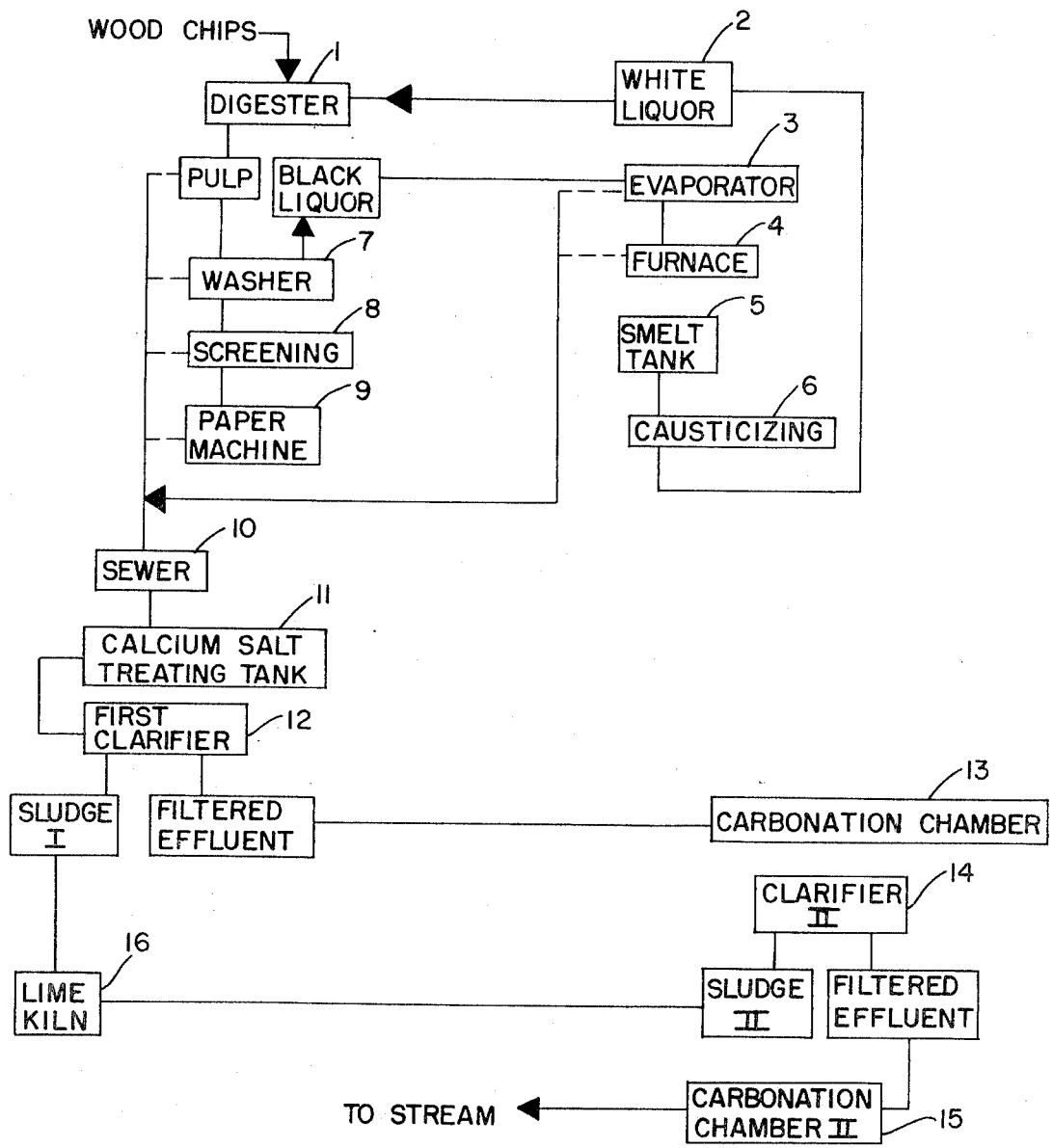
INVENTOR
EDGAR L. SPRUILL
BY Paul Shapiro
ATT'Y.

TREATMENT OF WASTE WATER FROM ALKALINE PULPING PROCESSES

BACKGROUND OF THE INVENTION

1. Field of the Invention

This invention relates to the treatment of the waste effluent containing suspended wood fibrous solids and dissolved wood degradation products from pulp and paper mills, and more particularly, relates to the purification of waste effluent from the alkaline pulping of wood.

2. The prior Art

In the production of wood pulp in accordance with the soda or sulfate process, it is the practice to cook or digest the raw wood chips in an alkaline liquor whose active constituents are essentially sodium compounds. During the digestion process, reactions occur between the sodium compounds and certain of the wood substances bonding the fibers together, principally lignin, which renders them soluble in the cooking liquor, thereby facilitating the reduction of the chip to its individual fibers or pulp.

After a batch of wood chips has been reduced to pulp in the cooking liquor, it is the practice to evacuate the digester in which the cooking was effected and to separate or wash the spent cooking liquor from the raw wood pulp in suitable washing equipment. The separated spent cooking liquor, commonly called "black liquor," contains wood degradation products, organic compounds which have been dissolved during the digestion, such as lignin, sugars, fatty and waxy substances, resins, and also inorganic sodium salts. In order to reclaim the sodium salts of the black liquor and simultaneously utilize the organic matter as fuel, the black liquor is evaporated to a solids content, including both organic and inorganic solids of about 50 to about 65 percent and then injected directly into a furnace where the organic substances are burned while the inorganic content remains as a residue or ash. This residue or ash is called "soda smelt" and contains sodium mainly in the form of $Na_2CO_3$, and in the case of soda smelt obtained by combusting black liquor from the sulfate process, also in the form of a minor amount of sodium sulfite. The smelt coming from the furnace is discharged into a body of water to form an aqueous solution, so-called "soda liquor" or "green liquor". The green liquor solution thus formed is delivered to a causticizing tank and lime is added thereto so as to convert the sodium carbonate into sodium hydroxide.

The following reactions take place in causticization:

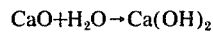
$$CaO + H_2O \rightarrow Ca(OH)_2$$

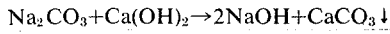
$$Na_2CO_3 + Ca(OH)_2 \rightarrow 2NaOH + CaCO_3 \downarrow$$

The resulting causticized solution is then allowed to stand to ensure a settling of the precipitated calcium carbonate or so-called "lime sludge". The solution is decanted and delivered to a storage tank from which liquid (referred to in the art as "white liquor") is withdrawn as needed for the digestion of wood chips. The precipitated $CaCO_3$ is passed to a lime kiln where the $CACO_3$ is burned at a temperature of about 800° to 950° C., whereby the calcium carbonate is thermally decomposed to CaO and $CO_2$ in accordance with the equation:

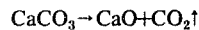
$$CaCO_3 \rightarrow CaO + CO_2 \uparrow$$

Although most of the material used in the above described pulping processes are consumed or reclaimed for later use in the process, effluents constituted by waste water from the different stages of the manufacture of paper, e.g., washing and purifying of the raw pulp, cannot be recuperated as they are diluted too much. This effluent which also contains soluble portions of wood removed during the pulping operation, such as lignin, carbohydrates, wood sugars, and the like, as well as wood fiber and other suspended matter washed from the pulp, referred to as fibrous sludge, is discharged to the pulp mill sewer. From the mill sewer, this waste effluent is passed to filtration and settling tanks where the fibrous sludge is separated from aqueous effluent. The fibrous sludge is trucked away for incineration disposal or use as land fill. The aqueous effluent is discharged to neighboring streams, rivers, or some other receiving body of water. This waste aqueous effluent is generally dark brown in color, and when discharged into natural waterways, such as streams, causes discoloration of the water.

The dark brown color of the waste effluent is due primarily to lignin and lignin-derived compounds which are very soluble in water and quite resistant to the common methods of water purification. Although it is known to effect color removal from the effluent by using such agents as alum, mineral acids, ferric sulfate, barium aluminum silicate, and activated silica, the costs are extremely high, especially when viewed against the great volumes of effluent discharged by paper mills. In U.S. Pat. No. 3,120,464, there is described a process wherein the spent bleach liquor from the bleaching of Kraft pulp is treated with lime to remove organic color bodies therefrom. The separated lime containing the color bodies absorbed thereon is reacted with the green liquor of the pulp process to prepare the white liquor which causes the organic color bodies to be dissolved in the white liquor. The color bodies are ultimately burned with the black liquor after the white liquor containing the dissolved color bodies is employed in the pulping process. This decoloration process has the disadvantage that substantial alteration of the causticizing operation is involved, and very large amounts of lime must be employed. For these reasons, the process is not widely used.

In addition to the removal of soluble, colored material from the effluent, the removal of suspended fibrous solids or sludge from the effluent is also a serious problem for pulp and paper mills. Despite efforts to remove the fibrous sludge from the effluent, discharge of waste water effluent containing suspended fibrous matter into streams, rivers, and other natural waterways still occurs and causes serious water pollution problems. The fibrous material generally will accumulate in the stream bed, clogging the free passage of water, and creating an unsightly appearance of the waterway. Present methods for effectively removing the fibrous sludge from the effluent generally involve the use of costly centrifugal concentration or complex filtration equipment.

Contemporary society is placing increasing demands on natural fresh water sources. Not only is industry demanding an increasing share of the available fresh water supply, but the rapidly expanding population is using more water in the home. Due in large part to these demands, both local and national governments are becoming more strict with industry as to its reintroduction of aqueous wastes into fresh water streams and rivers. Many regulations require that aqueous waste be substantially free of solid and dissolved adulterating constituents. In the pulp and paper industry, where it is not uncommon for a mill to discharge 10 to 40 million gallons of effluent per day, an economical method for the elimination of dissolved colored and suspended contaminants from the effluent is eagerly sought.

SUMMARY OF THE INVENTION

In accordance with the present invention, there is provided a process for the concomitant removal of dissolved ligneous color bodies and suspended fibrous solids from the effluent characteristic of waste waters of alkaline wood pulping processes wherein a water-soluble calcium salt, such as CaO or $Ca(OH)_2$ is added at a concentration of 500 to 3,300 parts of calcium salt per one million parts water, to a colored waste effluent containing dissolved ligneous color bodies and suspended fibrous material. The calcium salt is continuously contacted with the effluent waste for a period of about 0.25 to about 2 hours, whereby a separation of a first solid phase comprised of insoluble calcium salt, ligneous compounds and pulp fiber is effected from the effluent. The separated aqueous phase of the effluent is treated with $CO_2$ gas for a time sufficient to cause the substantial precipitation of the dissolved calcium salts as $CaCO_3$, and the remainder of the ligneous color bodies, the precipitated $CaCO_3$ and ligneous color bodies forming a second solid phase. The second solid phase is separated from the effluent, and the first and second solid phases are passed to a furnace, such as a lime kiln, wherein the ligneous color bodies and pulp fiber are burned and destroyed and the calcium salt is thermally decomposed and recovered as $CaO$.

The present process provides a means for the concomitant removal and disposal of color bodies and suspended fibrous pulp in waste effluent with its attendant advantages of cost reduction in process equipment and time.

The process of the present invention causes a substantial reduction, i.e., 80 to 95 percent, in the color of the aqueous waste effluent discharged from a pulp mill. The pulp fiber sludge concomitantly removed with the ligneous color bodies serves as an effective absorptive surface for the calcium salt-organic precipitate which facilitates the removal of the precipitate from the effluent and reduces the amount of calcium salt required to effect substantial decoloration of the effluent.

DESCRIPTION OF THE DRAWING

With the foregoing in mind, the present invention can be comprehended more readily by reference to the attached FIGURE which illustrates in a diagrammatic flow sheet the operative steps required in the operation of the process of the present invention.

With reference to the FIGURE, wood chips are charged into digester 1 where they are treated with cooking liquor from the white liquor storage unit 2. At the end of the cooking cycle, the pulp is removed from the digester 1 and separated from the cooking liquor. The recovered cooking liquor, or "black liquor," is passed to an evaporator 3 where it is concentrated to approximately 65 percent solids and is burned in a furnace 4. Volatiles are distilled off and the dried solids are smelted to an inorganic salt comprised primarily of sodium carbonate. This smelt is discharged from the furnace 4 into a smelt tank 5 where it is dissolved in water to form a solution known as "green liquor." This green liquor is passed to a causticizer unit 6 where the sodium carbonate is converted to caustic soda by treatment with lime and the liquor is thereby regenerated for use. The recausticized liquor, known as "white liquor" is passed to a storage unit 2 from which it can ultimately be passed into the digestor 1 for the pulping of wood chips.

The pulp separated from the cooking liquor in the digester 1 is pumped to a washing system 7 where dissolved wood degradation products and other impurities are removed from the pulp by washing with fresh water. The clean pulp goes onto screening unit 8 where additional water is removed and then to a paper machine 9 or to a bleaching operation for preparing bleached pulp.

The waste effluent stream discharged from the washing unit 7, screening unit 8 and paper machine 9, as well as spillage and washouts in evaporator 3 and furnace 4 is dark brown in color and contains dissolved ligneous compound and suspended wood particles and other fibrous solids. The effluent stream from these various units is passed to the mill sewer 10 from which it is then passed to a first calcium salt treating tank 11. The calcium salt treating tank 11 is equipped with a means for moderate agitation and the waste effluent stream is treated for removal of the dissolved and suspended material by effecting contact of the effluent with a water-soluble calcium salt. The proportions of the mixture of calcium salt and waste effluent may vary with the nature and concentration of the dissolved and suspended solids in the effluent and must be determined for a particular effluent. In general, the effluent is treated with the calcium salt in an amount which will exceed that consumed by the salt-reactive materials in the effluent stream and which will provide an excess of 400 to 1,000 parts unreacted calcium salt per 1 million parts water (by weight). If the calcium salt used to effect the treatment of the effluent is calcium oxide, the amount incorporated in the effluent stream in the treating tank 11 may vary between 500 to 2,500 parts of $CaO$ per million parts water (by weight). If calcium hydroxide is the calcium salt used, the amount of $Ca(OH)_2$ will vary between 660 and 3,300 parts $Ca(OH)_2$ per million parts water. The effluent and calcium salt are agitated in the first treating tank 11 for a time period of about 0.25 to 2.0 hours and preferably for a period of about 1 hour.

After the treatment period has been effected, the calcium salt treated effluent is passed to a first continuous clarifier unit 12 wherein the effluent is filtered and separated into two phases consisting of a first solid sludge phase consisting of precipitated fiber solids and calcium salt, and a clear, aqueous effluent phase. The filtered effluent is passed to a carbonation chamber 13 where the effluent is subjected to a carbonation treatment by contact with carbon dioxide gas or a carbon dioxide-containing gas. Lime kiln gas, if available, may often be freed from suspended matter and used to advantage, since it will normally contain from 20 to 45 percent carbon dioxide. The $CO_2$ gas precipitates the dissolved calcium salt, i.e., $Ca(OH)_2$ as $CaCO_3$. The treated effluent is passed through a second continuous clarifier 14 where the precipitated calcium carbonate or second sludge stream is settled and withdrawn. The effluent leaving the second clarifier 14 generally contains less than 50 p.p.m. calcium (as $CaCO_3$) and has a pH of 9.5 to 11.7. The clarified effluent is then passed through a second carbonation chamber 15 and treated with $CO_2$ gas to a substantially neutral pH. At this point, a color reduction of 80 to 95 percent will have been effected in the effluent. The first and second sludge streams are then mixed with the lime sludge from the causticizing tank, filtered, and pumped to a lime kiln 16 and burned. In this way, the major percentage of the dissolved organic color bodies and fibrous sludge normally discharged into streams from the pulp mill are conveniently burned and the pollution problem is thereby reduced.

It will be thus noted that the process of the present invention effects decoloration of pulp mill effluent without any change in the alkaline pulping process, and fibrous solids removal is accomplished without additional equipment or other capital costs.

In a typical example of the process of the present invention, waste effluent from the sewer of a Kraft pulp mill was collected and subjected to the purification process of the present invention.

An analysis of the waste effluent subjected to the purification process was as follows:

|  | Parts per million |
| --- | --- |
| Color | 675 |
| Chemical oxygen demand | 425 |
| Biological oxygen demand | 230 |
| Suspended solids | 380 |

The effluent having a pH of 8.2 was passed to a calcium salt treating unit wherein lime was added to the effluent at a concentration of 1,000 parts $CaO$ per million parts water. The mixture was gently agitated in the treating tank for a period of about 1 hour. The treated mixture was then passed through a first continuous clarifier where the mixture was filtered and the solids content of the mixture separated from the effluent as sludge. The filtered effluent was passed through a carbonation chamber where it was contacted with lime kiln gas at a rate sufficient to obtain a pH of 10.5. The carbonated effluent was passed to a second continuous clarifier where the solids content of the effluent, primarily $CaCO_3$ was separated and withdrawn. The effluent leaving the second clarifier contained less than 50 p.p.m. calcium (as $CaCO_3$) and had a pH of 10.5. The effluent was then carbonated with kiln gas to a neutral pH (7.0) and in this form was discharged.

An analysis of the discharged effluent was as follows:

|  | Parts per million |
| --- | --- |
| Color | 60 |
| Chemical oxygen demand | 195 |
| Biological oxygen demand | 155 |

Suspended solids 15

The sludges separated and collected from the first and second clarifiers are pumped to a Kraft pulp mill recovery unit where the sludges are mixed with the causticizing sludge from the causticizing tanks, filtered over a belt-type drum filter and then burned in a lime kiln.

What is claimed is:

1. A process for the concomitant removal of ligneous color bodies and suspended fibrous matter from the effluent waste waters of alkaline wood pulping processes which comprises:
   1. contacting the effluent containing dissolved ligneous color bodies and suspended fibrous wood material with a calcium salt from the group consisting of CaO and $Ca(OH)_2$, in an amount sufficient to provide an excess of 400 to 1,000 parts by weight unreacted calcium salt per 1 million parts water;
   2. separating a first solid phase comprised of insoluble calcium salt, ligneous compounds and fibrous wood material from the aqueous phase of the effluent;
   3. contacting the separated aqueous phase of the effluent with $CO_2$ gas for a time sufficient to cause the substantial precipitation of any dissolved calcium salts, as $CaCO_3$, and the remainder of the ligneous color bodies, the precipitated $CaCO_3$ and ligneous color bodies forming a second solid phase;
   4. separating the second solid phase from the aqueous phase of the effluent; and
   5. passing the first and second solid phases to a furnace, to burn and destroy the ligneous color bodies and fiber solids and recovering the calcium salt.

2. The process of claim 1 wherein the calcium salt used to contact the waste effluent is CaO.

3. The process of claim 1 wherein the calcium salt used to contact the waste effluent is $Ca(OH)_2$.

4. The process of claim 1 wherein the effluent is contacted with 500 to 2,500 parts by weight of CaO per million parts water.

5. The process of claim 1 wherein the effluent is contacted with 660 to 3,300 parts by weight of $CA(OH)_2$ per 1 million parts water.

6. The process of claim 1 wherein the effluent containing dissolved ligneous color bodies and suspended fibrous wood material is contacted with the calcium salt for a period of 0.25 to 2 hours.

* * * * *

Dedication 3,639,206.—*Edgar L. Spruill*, Jonesboro, La. TREATMENT OF WASTE WATER FROM ALKALINE PULPING PROCESSES. Patent dated Feb. 1, 1972. Dedication filed Aug. 20, 1974, by the assignee, *Continental Can Company, Inc.*

Hereby dedicates the entire term of said patent to the Public.

[*Official Gazette November 12, 1974.*]